(12) United States Patent
Cheng et al.

(10) Patent No.: US 10,164,292 B2
(45) Date of Patent: Dec. 25, 2018

(54) ELECTROLYTE ADDITIVES

(71) Applicant: Wildcat Discovery Technologies, Inc., San Diego, CA (US)

(72) Inventors: Gang Cheng, San Diego, CA (US); Jinhua Huang, San Diego, CA (US); Ye Zhu, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 0 days.

(21) Appl. No.: 15/441,892

(22) Filed: Feb. 24, 2017

(65) Prior Publication Data

US 2018/0248225 A1 Aug. 30, 2018

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01); *H01M 2300/0025* (2013.01)

(58) Field of Classification Search
CPC ......... H01M 10/0567; H01M 10/0525; H01M 2300/0025
See application file for complete search history.

(56) References Cited

U.S. PATENT DOCUMENTS

| | | | | |
|---|---|---|---|---|
| 5,849,432 A | * | 12/1998 | Angell | H01M 10/0569 429/199 |
| 2004/0048165 A1 | * | 3/2004 | Coowar | H01M 6/164 429/332 |
| 2005/0084760 A1 | | 4/2005 | Hwang et al. | |
| 2010/0047695 A1 | | 2/2010 | Smart et al. | |
| 2010/0297510 A1 | * | 11/2010 | Kim | H01M 10/0525 429/338 |
| 2011/0070481 A1 | | 3/2011 | Liang et al. | |
| 2012/0135298 A1 | * | 5/2012 | Yamada | H01M 10/0565 429/163 |
| 2014/0272553 A1 | | 9/2014 | Cheng et al. | |
| 2014/0272604 A1 | | 9/2014 | Lim et al. | |
| 2015/0079482 A1 | * | 3/2015 | Omaru | H01M 10/0525 429/332 |
| 2017/0149039 A1 | * | 5/2017 | Shon | H01M 2/1653 |

* cited by examiner

*Primary Examiner* — Eugenia Wang
(74) *Attorney, Agent, or Firm* — Corridor Law Group, P.C.

(57) ABSTRACT

Described herein are additives for use in electrolytes that provide a number of desirable characteristics when implemented within batteries, such as high capacity retention during battery cycling at high temperatures. In some embodiments, a high temperature electrolyte includes a base electrolyte and one or more polymer additives, which impart these desirable performance characteristics.

5 Claims, 3 Drawing Sheets

ELECTROLYTE ADDITIVES

BACKGROUND OF THE INVENTION

The present invention is in the field of battery technology and, more particularly, in the area of additive compounds for use with high-energy electrodes in electrochemical cells.

A liquid electrolyte serves to transport ions between electrodes in a battery. Organic carbonate-based electrolytes are most commonly used in lithium-ion ("Li-ion") batteries and, more recently, efforts have been made to develop new classes of electrolytes based on sulfones, silanes, and nitriles. Unfortunately, these conventional electrolytes typically often cannot be operated at high voltages and/or at high temperatures. At high voltages, conventional electrolytes can decompose, for example, by catalytic oxidation in the presence of cathode materials, to produce undesirable products that affect both the performance and safety of a battery. Conventional electrolytes may also be degraded by reduction by the anodes when the cells are charged.

As described in more detail below, solvents, salts, or additives have been incorporated into the electrolyte to decompose on the electrode to form a protective film called a solid electrolyte interphase (SEI). Depending on the exact chemical system, this film can be composed of organic or inorganic lithium salts, organic molecules, oligomers, or polymers. Often, several components of the electrolyte are involved in the formation of the SEI (e.g., lithium salt, solvent, and additives). As a result, depending on the rate of decomposition of the different components, the SEI can be more or less homogenous.

In past research, organic compounds containing polymerizable functional groups such as alkenes, furan, thiophene, and pyrrole had been reported to form an SEI on the cathode of lithium ion batteries. See, e.g., Y.-S. Lee et al., *Journal of Power Sources* 196 (2011) 6997-7001. These additives likely undergo polymerization during cell charging to form passivation films on the electrodes. SEIs are known to contain high molecular weight species. However, in situ polymerization during the initial charge often cannot be controlled in a precise enough manner to prevent non-uniform SEIs comprised of polymer or oligomer mixtures with either heterogeneous molecular weight, heterogeneous composition, or even undesired adducts. The non-uniformity of the SEI often results in poor mechanical and electrochemical stability, which is believed to be a main cause of cycle life degradation in lithium ion batteries. Thus, the improvement in cell performance using these materials is limited.

Further, certain organic polymers have also been used as solid electrolytes for lithium ion batteries due to the generally low volatility and safety of polymeric molecules as compared to smaller organic molecules, such as organic carbonates. However, practical application of such systems has been limited due to poor ionic conductivity.

For high-energy cathode materials, electrolyte stability remains a challenge. Recently, the need for better performance and higher capacity lithium ion secondary batteries used for power sources is dramatically increasing. Lithium transition metal oxides such as $LiCoO_2$ ("LCO") and $LiNi_{0.33}Mn_{0.33}Co_{0.33}O_2$ ("NMC") are state-of-the-art high-energy cathode materials used in commercial batteries. Yet only about 50% of the theoretical capacity of LCO or NMC cathodes can be used with stable cycle life. To obtain the higher capacity, batteries containing these high-energy materials need to be operated at higher voltages, such as voltages above about 4.2V. However, above about 4.3V, conventional electrolytes degrade and this leads to a significant deterioration of the cycle life. Further, the decomposition of the electrolyte at higher voltages can generate gas (such as $CO_2$, $O_2$, ethylene, $H_2$) and acidic products, both of which can damage a battery. These effects are further enhanced in "high nickel" NMC compositions such as $LiNi_{0.6}Mn_{0.2}Co_{0.2}O_2$ or $LiNi_{0.8}Mn_{0.1}Co_{0.1}O_2$ or others which can provide higher capacities due to the electrochemistry of the nickel.

Many of these same challenges occur when a battery is operated at high temperature. That is, conventional electrolytes can decompose by oxidation or may be degraded by reduction at high temperature analogous to the way these mechanisms affect the electrolytes at high voltage. Other parasitic reactions can also occur at elevated temperature.

As disclosed herein, these challenges and others are addressed in high energy lithium ion secondary batteries including cathode active materials that are capable of operation at high voltage and/or high temperature.

BRIEF SUMMARY OF THE INVENTION

Certain embodiments relate to a battery including an anode, a cathode, and an electrolyte formulation including a lithium salt, a non-aqueous solvent, and an ester-containing polymer additives. The cathode material can be an NMC material.

Preferred ester-containing polymer additives include poly (vinyl acetate) ("PVA") and the polymer additive poly(1,4-butylene adipate) ("PBA").

In some embodiments, polymers having an alkyl group or substituted alkyl group at the methyl position of poly(vinyl acetate) can be suitable polymer additives for electrolyte solutions are preferred.

Certain embodiments include methods making, using, and conditioning such batteries for use.

Other aspects and embodiments of the invention are also contemplated. The foregoing summary and the following detailed description are not meant to restrict the invention to any particular embodiment but are merely meant to describe some embodiments of the invention.

DETAILED DESCRIPTION OF THE INVENTION

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

The term "specific capacity" refers to the amount (e.g., total or maximum amount) of electrons or lithium ions a material is able to hold (or discharge) per unit mass and can be expressed in units of mAh/g. In certain aspects and embodiments, specific capacity can be measured in a constant current discharge (or charge) analysis, which includes discharge (or charge) at a defined rate over a defined voltage range against a defined counter electrode. For example, specific capacity can be measured upon discharge at a rate of about 0.05 C (e.g., about 8.75 mA/g) from 4.45 V to 3.0 V versus a Li/Li$^+$ counter electrode. Other discharge rates and other voltage ranges also can be used, such as a rate of about 0.1 C (e.g., about 17.5 mA/g), or about 0.5 C (e.g., about 87.5 mA/g), or about 1.0 C (e.g., about 175 mA/g).

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

The term "coulombic efficiency" is sometimes abbreviated herein as CE and refers the efficiency with which charge is transferred in a given cycle.

The term "rated charge voltage" refers to an upper end of a voltage range during operation of a battery, such as a maximum voltage during charging, discharging, and/or cycling of the battery. In some aspects and some embodiments, a rated charge voltage refers to a maximum voltage upon charging a battery from a substantially fully discharged state through its (maximum) specific capacity at an initial cycle, such as the 1st cycle, the 2nd cycle, or the 3rd cycle. In some aspects and some embodiments, a rated charge voltage refers to a maximum voltage during operation of a battery to substantially maintain one or more of its performance characteristics, such as one or more of coulombic efficiency, retention of specific capacity, retention of energy density, and rate capability.

The term "rated cut-off voltage" refers to a lower end of a voltage range during operation of a battery, such as a minimum voltage during charging, discharging, and/or cycling of the battery. In some aspects and some embodiments, a rated cut-off voltage refers to a minimum voltage upon discharging a battery from a substantially fully charged state through its (maximum) specific capacity at an initial cycle, such as the 1st cycle, the 2nd cycle, or the 3rd cycle, and, in such aspects and embodiments, a rated cut-off voltage also can be referred to as a rated discharge voltage. In some aspects and some embodiments, a rated cut-off voltage refers to a minimum voltage during operation of a battery to substantially maintain one or more of its performance characteristics, such as one or more of coulombic efficiency, retention of specific capacity, retention of energy density, and rate capability.

The "maximum voltage" refers to the voltage at which both the anode and the cathode are fully charged. In an electrochemical cell, each electrode may have a given specific capacity and one of the electrodes will be the limiting electrode such that one electrode will be fully charged and the other will be as fully charged as it can be for that specific pairing of electrodes. The process of matching the specific capacities of the electrodes to achieve the desired capacity of the electrochemical cell is "capacity matching."

The term "NMC" refers generally to cathode materials containing $LiNi_xMn_yCo_zO_w$ and includes, but is not limited to, cathode materials containing $LiNi_{0.33}Mn_{0.33}Co_{0.33}O_2$, $LiNi_{0.5}Mn_{0.3}Co_{0.2}O_2$, and $LiNi_{0.4}Mn_{0.4}Co_{0.2}O_2$.

The term "polymer" refers generally to a molecule whose structure is composed of multiple repeating units. The structure can be linear or branched. In the chemical formulas depicted herein, the subscripts "m" and "n" refer to the number of repeating units and are positive integers. The term polymer includes homopolymers and copolymers as those terms are used herein.

The term "homopolymer" refers to a polymer that is made by polymerization of a single monomer.

The term "copolymer" refers generally to a molecule whose structure is composed of at least two different repeating units. The structure can be alternating, periodic, statistical, random, block, linear, branched, combinations thereof, or other structure. In certain embodiments disclosed herein, the copolymer is preferably a block copolymer. In certain embodiments disclosed herein, the copolymer is preferably a random copolymer. In certain embodiments disclosed herein, the copolymer is preferably a branched copolymer.

As used herein, the term "moiety" refers to a distinct, structurally identifiable, structurally isolated, or structurally named portion of a molecule.

To the extent certain battery characteristics can vary with temperature, such characteristics are specified at room temperature (about 30 degrees C.), unless the context clearly dictates otherwise.

Ranges presented herein are assumed to be inclusive of their endpoints unless context or mathematical symbols indicated otherwise. Thus, for example, the range 1 to 3 includes the values 1 and 3 as well as intermediate values.

Figure 1:
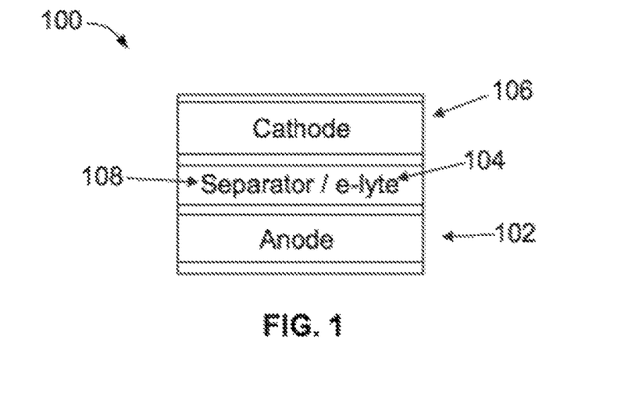
FIG. 1 illustrates a lithium ion battery implemented in accordance with an embodiment of the invention.

FIG. 1 illustrates a lithium ion battery 100 implemented in accordance with an embodiment of the invention. The battery 100 includes an anode 102, a cathode 106, and a separator 108 that is disposed between the anode 102 and the cathode 106. In the illustrated embodiment, the battery 100 also includes a high voltage electrolyte 104, which is disposed within and between the anode 102 and the cathode 106 and remains stable during high voltage battery cycling.

The operation of the battery 100 is based upon reversible intercalation and de-intercalation of lithium ions into and from host materials of the anode 102 and the cathode 106. Other implementations of the battery 100 are contemplated, such as those based on conversion chemistry. Referring to FIG. 1, the voltage of the battery 100 is based on redox potentials of the anode 102 and the cathode 106, where lithium ions are accommodated or released at a lower potential in the former and a higher potential in the latter. To allow both a higher energy density and a higher voltage platform to deliver that energy, the cathode 106 can include an active cathode material for high voltage operations at or above 4.3V.

Examples of suitable cathode materials include phosphates, fluorophosphates, fluorosulfates, fluorosilicates, spinels, lithium-rich layered oxides, and composite layered oxides. Further examples of suitable cathode materials include: spinel structure lithium metal oxides, layered structure lithium metal oxides, lithium-rich layered structured lithium metal oxides, lithium metal silicates, lithium metal phosphates, metal fluorides, metal oxides, sulfur, and metal sulfides. Examples of suitable anode materials include conventional anode materials used in lithium ion batteries, such as lithium, graphite ("$Li_xC_6$"), and other carbon, silicon, or oxide-based anode materials.

Figure 2:
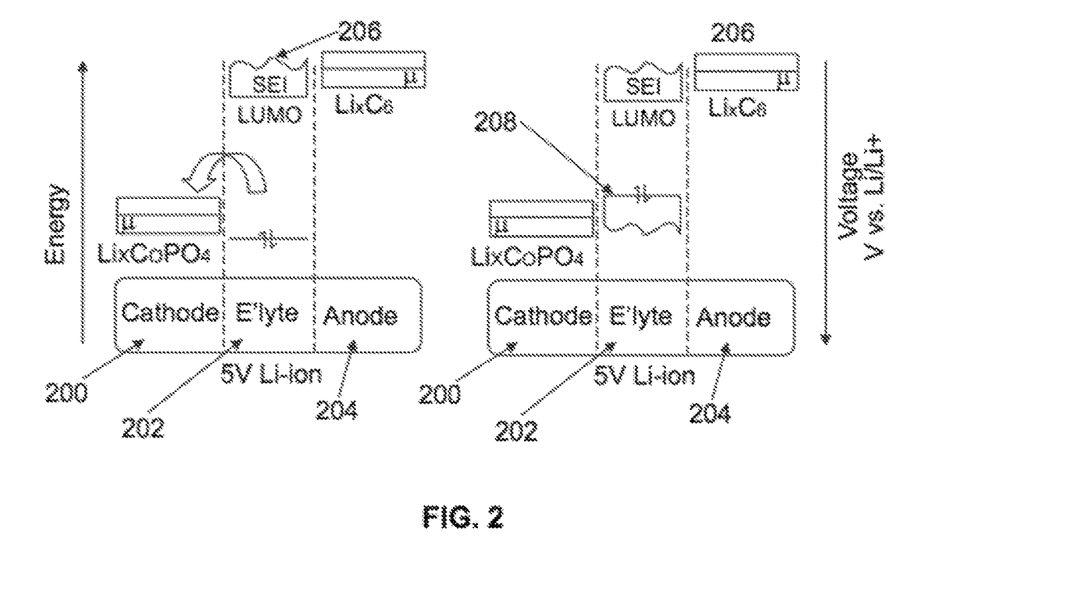
FIG. 2 illustrates the operation of a lithium ion battery and a graphical representation of an illustrative non-limiting mechanism of action of an electrolyte including an additive compound, according to an embodiment of the invention.

FIG. 2 illustrates operation of a lithium ion battery and an illustrative, non-limiting mechanism of action of an improved electrolyte, according to an embodiment of the invention. Without being bound by a particular theory not recited in the claims, the inclusion of one or more stabilizing additive compounds in an electrolyte solution can, upon operation of the battery (e.g., during conditioning thereof), passivate a cathode material, thereby reducing or preventing reactions between bulk electrolyte components and the cathode material that can degrade battery performance.

Referring to FIG. 2, an electrolyte 202 includes a base electrolyte, and, during initial battery cycling, components within the base electrolyte can assist in the in-situ formation of a protective film (in the form of a solid electrolyte interface ("SEI") 206) on or next to an anode 204. The anode SEI 206 can inhibit reductive decomposition of the electrolyte 202. Preferably, and without being bound by theory not recited in the claims, for operation at voltages at or above 4.2 V, the electrolyte 202 can also include additives that can assist in the in-situ formation of a protective film (in the form of a SEI 208 or another derivative) on or next to a cathode 200. The cathode SEI 208 can inhibit oxidative decomposition of the high voltage electrolyte 202 that can otherwise occur during high voltage operations. As such, the cathode SEI 208 can inhibit oxidative reactions in a counterpart manner to the inhibition of reductive reactions by the anode SEI 206. In the illustrated embodiment, the cathode SEI 208 can have a thickness in the sub-micron range, and can include one or more chemical elements corresponding to, or derived from, those present in one or more additives, such as silicon or other heteroatom included in one or more additives. Advantageously, one or more additives can preferentially passivate the cathode 200 and can selectively contribute towards film formation on the cathode 200, rather than the anode 204. Such preferential or selective film formation on the cathode 200 can impart stability against oxidative decomposition, with little or no additional film formation on the anode 204 (beyond the anode SEI 206) that can otherwise degrade battery performance through resistive losses. More generally, one or more additives can decompose below a redox potential of the cathode material and above a redox potential of SEI formation on the anode 204.

Without being bound by a particular theory not recited in the claims, the formation of the cathode SEI 208 can occur through one or more of the following mechanisms: (1) the additive compound(s) can decompose to form the cathode SEI 208, which inhibits further oxidative decomposition of electrolyte components; (2) the additive compound(s) or its decomposed product(s) form or improve the quality of a passivation film on the cathode or anode; (3) the additive compounds can form an intermediate product, such as a complex with $LiPF_6$ or a cathode material, which intermediate product then decomposes to form the cathode SEI 208 that inhibits further oxidative decomposition of electrolyte components; (4) the additive compounds can form an intermediate product, such as a complex with $LiPF_6$, which then decomposes during initial charging. The resulting decomposition product can then further decompose during initial charging to form the cathode SEI 208, which inhibits further oxidative decomposition of electrolyte components; (5) the additive compounds can stabilize the cathode material by preventing metal ion dissolution.

Other mechanisms of action of the electrolyte 202 are contemplated, according to an embodiment of the invention. For example, and in place of, or in combination with, forming or improving the quality of the cathode SEI 208, one or more additives or a derivative thereof can form or improve the quality of the anode SEI 206, such as to reduce the resistance for lithium ion diffusion through the anode SEI 206. As another example, one or more additives or a derivative thereof can improve the stability of the electrolyte 202 by chemically reacting or forming a complex with other electrolyte components. As a further example, one or more additives or a derivative thereof can scavenge decomposition products of other electrolyte components or dissolved electrode materials in the electrolyte 202 by chemical reaction or complex formation. Any one or more of the cathode SEI 208, the anode SEI 206, and the other decomposition products or complexes can be viewed as derivatives, which can include one or more chemical elements corresponding to, or derived from, those present in one or more additives, such as a heteroatom included in the additives.

Certain embodiments are related to a class of polymeric additives for non-aqueous electrolytes. Such embodiments include several electrolyte additives that improve the oxidative stability of the electrolyte and the cycle life and coulombic efficiency of electrochemical cells containing these additives.

A high voltage electrolyte according to some embodiments of the invention can be formed with reference to the formula:

base electrolyte+additive→high voltage electrolyte    (1)

A high temperature electrolyte according to some embodiments of the invention can be formed with reference to the formula:

base electrolyte+additive→high temperature electrolyte    (2)

In formulas (1) and (2), the base electrolyte can include one or more solvents and one or more salts, such as lithium-containing salts in the case of lithium ion batteries. Examples of suitable solvents include nonaqueous electrolyte solvents for use in lithium ion batteries, including carbonates, such as ethylene carbonate, dimethyl carbonate, ethyl methyl carbonate, propylene carbonate, methyl propyl carbonate, and diethyl carbonate; sulfones; silanes; nitriles; esters; ethers; and combinations thereof. The base electrolyte can also include additional small molecule additives.

Referring to formulas (1) and (2), an amount of a particular additive can be expressed in terms of a weight percent of the additive relative to a total weight of the electrolyte solution (or wt. %). For example, an amount of an additive can be in the range of about 0.01 wt. % to about 30 wt. %, such as from about 0.05 wt. % to about 30 wt. %, from about 0.01 wt. % to about 20 wt. %, from about 0.2 wt. % to about 15 wt. %, from about 0.2 wt. % to about 10 wt. %, from about 0.2 wt. % to about 5 wt. %, or from about 0.2 wt. % to about 1 wt. %, and, in the case of a combination of multiple additive, a total amount of the additive can be in the range of about 0.01 wt. % to about 30 wt. %, such as from about 0.05 wt. % to about 30 wt. %, from about 0.01 wt. % to about 20 wt. %, from about 0.2 wt. % to about 15 wt. %, from about 0.2 wt. % to about 10 wt. %, from about 0.2 wt. % to about 5 wt. %, or from about 0.2 wt. % to about 1 wt. %. An amount of an additive also can be expressed in terms of a ratio of the number of moles of the additive per unit surface area of either, or both, electrode materials. For example, an amount of a compound can be in the range of about $10^{-7}$ mol/m$^2$ to about $10^{-2}$ mol/m$^2$, such as from about $10^{-7}$ mol/m$^2$ to about $10^{-5}$ mol/m$^2$, from about $10^{-5}$ mol/m$^2$ to about $10^{-3}$ mol/m$^2$, from about $10^{-6}$ mol/m$^2$ to about $10^{-4}$ mol/m$^2$, or from about $10^{-4}$ mol/m$^2$ to about $10^{-2}$ mol/m$^2$. As further described below, a additive can be consumed or can react, decompose, or undergo other modifications during initial battery cycling. As such, an amount of a compound can refer to an initial amount of the compound used during the formation of the electrolyte solutions according to formulas (1) or (2), or can refer to an initial amount of the additive within the electrolyte solution prior to battery cycling (or prior to any significant amount of battery cycling).

Resulting performance characteristics of a battery can depend upon the identity of a particular additive used to form the high voltage electrolyte according to formulas (1) or (2), an amount of the compound used, and, in the case of a combination of multiple compounds, a relative amount of each compound within the combination. Accordingly, the resulting performance characteristics can be fine-tuned or optimized by proper selection of the compounds and adjusting amounts of the compounds in formulas (1) or (2).

The formation according to formulas (1) or (2) can be carried out using a variety of techniques, such as by mixing the base electrolyte and the additives, dispersing the additives within the base electrolyte, dissolving the additives within the base electrolyte, or otherwise placing these components in contact with one another. The additives can be provided in a liquid form, a powdered form (or another solid form), or a combination thereof. The additives can be incorporated in the electrolyte solutions of formulas (1) or (2) prior to, during, or subsequent to battery assembly.

The electrolyte solutions described herein can be used for a variety of batteries containing a high voltage cathode or a low voltage cathode, and in batteries operated at high temperatures. For example, the electrolyte solutions can be substituted in place of, or used in conjunction with, conventional electrolytes for lithium ion batteries for operations at or above 4.2 V. In particular, these additives are useful for lithium ion batteries containing NMC cathode materials.

Batteries including the electrolyte solutions can be conditioned by cycling prior to commercial sale or use in commerce. Such conditioning can include, for example, providing a battery, and cycling such battery through at least 1, at least 2, at least 3, at least 4, or at least 5 cycles, each cycle including charging the battery and discharging the battery at a rate of 0.05 C (e.g., a current of 8.75 mA/g) between 4.45V and 3.0V (or another voltage range) versus a reference counter electrode, such as a graphite anode. Charging and discharging can be carried out at a higher or lower rate, such as at a rate of 0.1 C (e.g., a current of 17.5 mA/g), at a rate of 0.5 C (e.g., a current of 87.5 mA/g), or at a rate of 1 C (e.g., a current of 175 mA/g). Typically a battery is conditioned with 1 cycle by charging at 0.05 C rate to 4.45V followed by applying constant voltage until the current reaches 0.02 C, and then discharging at 0.05 C rate to 3V.

The polymer additives according to embodiments herein are molecules formed from numerous repeated monomer units, as is conventionally understood in the art. Such polymer additives contain certain functional groups along the backbone of the polymer chain.

The polymers disclosed herein are generally referred to by the names of the monomer molecules that are used to synthesize the polymer. While the polymers referred to herein generally are named by the monomers used to form them, it is possible that some of the polymers could be referred to by alternate names. The disclosure is intended to encompass such variations in chemical nomenclature without departing from the scope and spirit of the invention.

The number of repeat units in the polymers disclosed herein is greater than 1; and is in some cases greater than 100; in some cases greater than 250; in some cases greater than 500; in some cases greater than 1,000; in some cases greater than 5,000; in some cases greater than 10,000; in some cases greater than 50,000; in some cases greater than 100,000; in some cases greater than 500,000; and in some cases greater than 1,000,000.

The number of repeat units in the polymers disclosed herein is greater than 1; and is in some cases less than 100; in some cases less than 250; in some cases less than 500; in some cases less than 1,000; in some cases less than 5,000; in some cases less than 10,000; in some cases less than 50,000; in some cases less than 100,000; in some cases less than 500,000; and in some cases less than 1,000,000.

In certain embodiments disclosed herein, ester-containing polymers are used as additives to a conventional electrolyte solution for a lithium ion battery. In some embodiments, the polymers described herein are synthesized from polymeric reactions using a reactive ester polymer precursor. These polymer additives can form more mechanically and chemically stable SEI films compared to small molecule or short-chain oligomers, resulting in improved cycle life at high temperatures and high voltages. The results presented herein demonstrate that the polymer additives having ester functionality can significantly improve battery performance as compared to a control electrolyte without the polymer additive.

Certain ester-containing polymers are preferred as electrolyte additives. For example, poly(vinyl acetate), which can be represented by Formula (a), is a preferred electrolyte additive in certain embodiments of the invention:

(a)

More broadly, polymers having an alkyl group or substituted alkyl group at the methyl position of poly(vinyl acetate) can be suitable polymer additives for electrolyte solutions. For example, Formula (b) illustrates a chemical structure where $R_1$ can be an alkyl group. As used herein alkyl groups include lower alkyls (an alkyl that includes from 2 to 20 carbon atoms, such as from 2 to 10 carbon atoms), upper alkyls (an alkyl that includes more than 20 carbon atoms, such as from 21 to 100 carbon atoms), cycloalkyls (an alkyl that includes one or more ring structures), heteroalkyls (an alkyl that has one or more of its carbon atoms replaced by one or more heteroatoms, such as

N, Si, S, O, F, and P), and branched forms of all such alkyls. Alkyls can be substituted such that one or more of its hydrogen atoms is replaced by one or more substituent groups, such as halo groups. An alkyl can have a combination of characteristics. Examples of alkyl groups include methyl, ethyl, n-propyl, isopropyl, cyclopropyl, butyl, isobutyl, t-butyl, cyclobutyl, and hetero, or substituted forms thereof.

Formula (b) is:

(b)

Another example of a preferred electrolyte additive in certain embodiments of the invention is the polymer poly (1,4-butylene adipate), which is represented by Formula (c):

(c)

Simple substitutions along the backbone of the polymer depicted in Formula (c) are included in this disclosure.

Certain properties are preferred in polymer additives for use in electrochemical cells. For example, the additives preferably are: (i) either chemically resistant to oxidation and/or reduction under the cell conditions or, if not chemically resistant to oxidation and/or reduction, then the additives should decompose to intermediates or products that form a stable SEI film on the anode, cathode, or both; and (ii) sufficiently soluble in electrolyte solution at room temperature and to make the electrolyte solution viscosity during battery operation not worse than without the additive.

In addressing the challenges of high energy cathode materials, the additives according to embodiments disclosed herein have a number of benefits, including: (i) unique functional groups pre-arranged in the backbone, which allows the polymer additives to strongly and evenly adsorb on to the surface of the electrodes before decomposition and potentially improving the quality and stability of the resulting SEI; and (ii) mechanical and chemical stability as compared to organic oligomers and short-chain polymers formed from conventional solvents and additives due to the pre-formed polymer backbone.

Further, the high molecular weight SEI species resulting from reactions of the ring-opening decomposition of the succinic anhydride moiety with lithium salt species can: (i) be homogenously dispersed throughout the SEI to form a more uniform film; (ii) provide a more mechanically and chemically stable SEI on both cathode and anode surface; (iii) be used to chelate cathode transition metal ions dissolved in the electrolyte, which prevents anode SEI breakdown leading to capacity fade; and (iv) function as scavenger or acidic reactive species and/or protonic reactive species, which decreases chain reactions of solvent and SEI decomposition caused by those reactive species.

In certain embodiments of the invention, the additive is present at an amount that is significantly lower than the amount of electrolyte salt present in the electrolyte formulation of the electrochemical cell. The amount of additive can be expressed as a weight percent (wt %) of the total weight of the electrolyte formulation. In certain embodiments of the invention, the concentration of additive in the electronic formulation is less than or equal to the concentration at which the additive would be at the saturation point in the electrolyte solvent. In certain embodiments of the invention, the concentration of additive in the electronic formulation is less than or equal to about 10 weight percent, more preferably less than or equal to about 9 weight percent, more preferably less than or equal to about 8 weight percent, more preferably less than or equal to about 7 weight percent, more preferably less than or equal to about 6 weight percent, more preferably less than or equal to about 5 weight percent, more preferably less than or equal to about 4 weight percent, more preferably less than or equal to about 3 weight percent, and still more preferably less than or equal to about 2 weight percent.

In certain embodiments of the invention, the concentration of each additive in the electronic formulation is equal to about 10.0 wt %, 9.9 wt %, 9.8 wt %, 9.7 wt %, 9.6 wt %, 9.5 wt %, 9.4 wt %, 9.3 wt %, 9.2 wt %, 9.1 wt %, 9.0 wt %, 8.9 wt %, 8.8 wt %, 8.7 wt %, 8.6 wt %, 8.5 wt %, 8.4 wt %, 8.3 wt %, 8.2 wt %, 8.1 wt %, 8.0 wt %, 7.9 wt %, 7.8 wt %, 7.7 wt %, 7.6 wt %, 7.5 wt %, 7.4 wt %, 7.3 wt %, 7.2 wt %, 7.1 wt %, 7.0 wt %, 6.9 wt %, 6.8 wt %, 6.7 wt %, 6.6 wt %, 6.5 wt %, 6.4 wt %, 6.3 wt %, 6.2 wt %, 6.1 wt %, 6.0 wt %, 5.9 wt %, 5.8 wt %, 5.7 wt %, 5.6 wt %, 5.5 wt %, 5.4 wt %, 5.3 wt %, 5.2 wt %, 5.1 wt %, 5.0 wt %, 4.9 wt %, 4.8 wt %, 4.7 wt %, 4.6 wt %, 4.5 wt %, 4.4 wt %, 4.3 wt %, 4.2 wt %, 4.1 wt %, 4.0 wt %, 3.9 wt %, 3.8 wt %, 3.7 wt %, 3.6 wt %, 3.5 wt %, 3.4 wt %, 3.3 wt %, 3.2 wt %, 3.1 wt %, 3.0 wt %, 2.9 wt %, 2.8 wt %, 2.7 wt %, 2.6 wt %, 2.5 wt %, 2.4 wt %, 2.3 wt %, 2.2 wt %, or 2.1 wt %, 2.0 wt %, 1.9 wt %, 1.8 wt %, 1.7 wt %, 1.6 wt %, 1.5 wt %, 1.4 wt %, 1.3 wt %, 1.2 wt %, 1.1 wt %, 1.0 wt %, 0.9 wt %, 0.8 wt %, 0.7 wt %, 0.6 wt %, 0.5 wt %, 0.4 wt %, 0.3 wt %, 0.2 wt %, or 0.1 wt %. In certain embodiments of the invention, the concentration of additive in the electrolyte formulation is in the range of about 2.0 wt % to about 0.5 wt %.

The following examples and methods describe specific aspects of some embodiments of the invention to illustrate and provide a description for those of ordinary skill in the art. The examples and methods should not be construed as limiting the invention, as the examples and methods merely provide specific methodology useful in understanding and practicing some embodiments of the invention.

Methods

Battery Cell Assembly.

Battery cells were formed in a high purity Argon filled glove box (M-Braun, $O_2$ and humidity content<0.1 ppm). In the case of the cathode, a commercial $LiNi_{0.5}Mn_{0.3}Co_{0.2}O_2$ (referred to herein as NMC 532) or $LiNi_{0.4}Mn_{0.4}Co_{0.2}O_2$ (referred to herein as NMC 442) cathode material was mixed with dry poly(vinylidene fluoride), carbon black powder, and liquid 1-methyl-2-pyrrolidinone to form a slurry. The resulting slurry was deposited on an aluminum current collector and dried to form a composite cathode film. In the case of the anode, a graphitic carbon was mixed with dry poly(vinylidene fluoride), carbon black powder, and liquid 1-methyl-2-pyrrolidinone to form a slurry. The resulting slurry was deposited on a copper current collector and dried to form a composite anode film. Each battery cell included the composite cathode film, a polypropylene separator, and composite anode film. A conventional electrolyte formed from 1M of LiPF6 in ethylene carbonate and ethyl methyl carbonate (EC:EMC=1:2) by volume was mixed with the desired weight percentage of an embodiment of the inventive additive and added to the battery cell. The battery cell was sealed and initially cycled at ambient temperature using 0.1 C charge to upper cutoff voltage (up to 4.4V) followed by constant voltage hold until the current dropped to 0.05 C and then discharged to 2.8V using 0.1 C constant current. The cycle was repeated one more time prior to high temperature cycling.

High Temperature Testing.

Test batteries were cycled up to 4.4V in an environment at a temperature of about 40 degrees Celsius using 0.5 C charge followed by constant voltage hold for 1 hour and then discharged to 2.8V using 0.5 C constant current.

Figure 3:
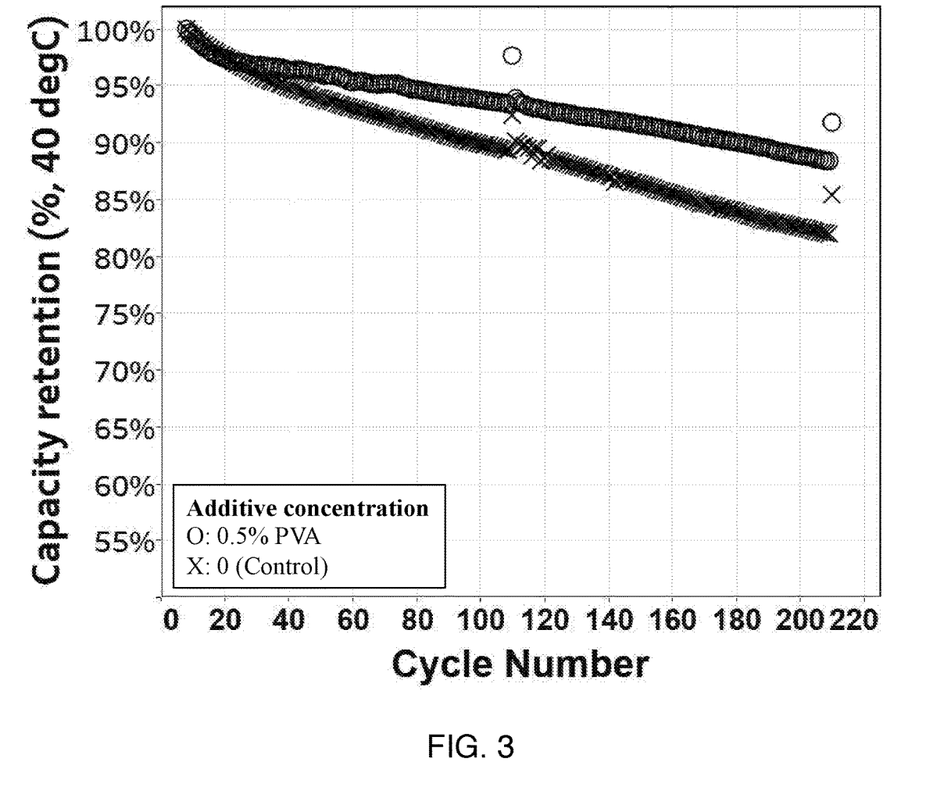
FIG. 3 illustrates the high temperature cycle life testing of an electrolyte formulation according to certain embodiments of the invention.
Figure 4:
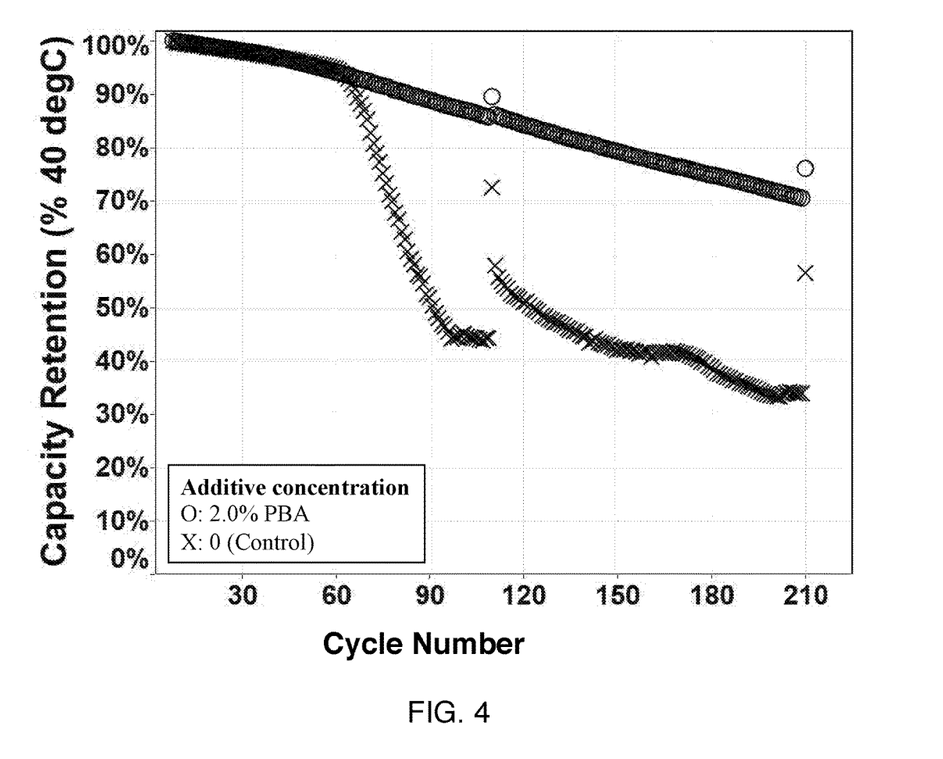
FIG. 4 illustrates the high temperature cycle life testing of an electrolyte formulation according to certain embodiments of the invention.

Table 1 shows certain data for the cycle life testing of some embodiments of the additives disclosed herein as compared to control and FIGS. 3 and 4 show the full cycle life testing. Specifically, data was collected on the polymer additive poly(vinyl acetate) ("PVA") with a molecular weight around 100,000 g/mol and the polymer additive poly(1,4-butylene adipate) ("PBA") with a molecular weight around 12,000 g/mol. These molecular weight values are weight average molecular weight determined by gel permeation chromatography (or size exclusion chromatography). For PVA, a preferred range for weight average molecular weight is from about 50,000 g/mol to about 500,000 g/mol. For PBA, a preferred range for weight average molecular weight is from about 1,000 g/mol to about 40,000 g/mol.

TABLE 1

Summary of additive performance compared to the control electrolyte

| Polymer Additives | Cell Chemistry | 1st Cycle Capacity, 30° C. (mAh/g) | 1st Cycle CE (%) | 200th Cycle Capacity Retention, 40° C. (%,) |
|---|---|---|---|---|
| None (Control) | 4.3 V NMC 532/Graphite | 180 | 88 | 82.6 |
| 0.5% PVA | 4.3 V NMC 532/Graphite | 183 | 89 | 88.9 |
| None (Control) | 4.4 V NMC 442/Graphite | 193 | 87 | 33.8 |
| 2.0% PBA | 4.4 V NMC 442/Graphite | 194 | 86 | 67.9 |

The data in Table 1 demonstrate that batteries using ester-containing polymer additives in the electrolyte solution have significantly improved high temperature capacity retention as compared to batteries without the ester-containing polymer additives in the electrolyte solution. Each of the batteries using ester-containing polymer additives in the electrolyte solution improved the capacity retention at the 200th cycle at high temperature as compared to the control battery.

FIG. 3 illustrates the high temperature cycle life testing of an electrolyte formulation including poly(vinyl acetate) as an additive. The battery included a NMC532 composite cathode and a graphite composite anode. The battery was cycled from 2.8V to 4.3V in an environment at a temperature of about 40 degrees Celsius. FIG. 3 demonstrates a reduction in capacity retention beginning around cycle 40 for the control battery while the test battery with the polymer additive in the electrolyte solution performs better than the control battery throughout the high temperature testing.

FIG. 4 illustrates the high temperature cycle life testing of an electrolyte formulation including poly(1,4-butylene adipate) as an additive. The battery included a NMC422 composite cathode and a graphite composite anode. The battery was cycled from 2.8V to 4.4V in an environment at a temperature of about 40 degrees Celsius. FIG. 3 demonstrates a dramatic reduction in capacity retention around cycle 60 for the control battery while the test battery with the polymer additive in the electrolyte solution performs significantly better than the control battery throughout the high temperature testing.

The data presented herein confirm that certain polymer additives can provide significant improvements to the high temperature capacity retention when added to electrolyte formulations. Specifically, batteries including an NMC composite cathode and graphite composite anode showed improvements as compared to a comparable battery without the polymer additives in the electrolyte formulation. Notably, the initial performance of the tested batteries was similar to the control batteries, which indicates that the additives do not have a negative impact on the cell capacity despite providing improved capacity retention.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A liquid electrolyte formulation, comprising:
a lithium salt,
a non-aqueous solvent, and
a polymer additive present at less than 10% by weight of the total weight of the liquid electrolyte formulation and represented by Formula (b):

(b)

where n is an integer greater than 1 and $R_1$ is an alkyl group or a substituted alkyl group and wherein the polymer additive is a homopolymer.

2. The liquid electrolyte formulation of claim 1, wherein the polymer additive is represented by Formula (a):

(a)

3. The liquid electrolyte formulation of claim 1, wherein the weight average molecular weight of the polymer additive is less than or equal to 500,000 g/mol.

4. The liquid electrolyte formulation of claim 1, wherein the polymer additive is present at a concentration of at least 0.1 weight percent of the total weight of the liquid electrolyte formulation.

5. The liquid electrolyte formulation of claim 1, wherein the polymer additive is present at a concentration of at least 0.5 weight percent of the total weight of the liquid electrolyte formulation.

* * * * *